(12) United States Patent
Hess et al.

(10) Patent No.: US 7,543,795 B2
(45) Date of Patent: Jun. 9, 2009

(54) SOLENOID VALVE HAVING A NOISE-REDUCING DAMPING DISK

(75) Inventors: Juergen Hess, Baden-Baden (DE); Georg Reeb, Buehl Eisental (DE)

(73) Assignee: Robert Bosch GmbH, Stuttgart (DE)

( * ) Notice: Subject to any disclaimer, the term of this patent is extended or adjusted under 35 U.S.C. 154(b) by 252 days.

(21) Appl. No.: 10/573,422

(22) PCT Filed: Jul. 28, 2004

(86) PCT No.: PCT/DE2004/001695

§ 371 (c)(1),
(2), (4) Date: Oct. 31, 2006

(87) PCT Pub. No.: WO2005/038322

PCT Pub. Date: Apr. 28, 2005

(65) Prior Publication Data

US 2007/0069165 A1    Mar. 29, 2007

(30) Foreign Application Priority Data

Sep. 23, 2003   (DE) ............................... 103 43 940

(51) Int. Cl.
*F16K 31/02* (2006.01)
(52) U.S. Cl. .................. 251/129.15; 251/50
(58) Field of Classification Search .............. 251/48, 251/50, 64, 129.15, 129.18
See application file for complete search history.

(56) References Cited

U.S. PATENT DOCUMENTS

| | | | | |
|---|---|---|---|---|
| 4,793,372 A | * | 12/1988 | Gauthier et al. | ............... 137/82 |
| 5,632,628 A | * | 5/1997 | Wagner | ......................... 439/78 |
| 5,727,596 A | * | 3/1998 | Eminger | ...................... 137/876 |
| 5,947,442 A | | 9/1999 | Shurman et al. | |
| 5,967,487 A | * | 10/1999 | Cook et al. | .................... 251/64 |
| 6,109,301 A | | 8/2000 | Pfetzer | |
| 6,267,350 B1 | | 7/2001 | Slawinski et al. | |
| 6,289,919 B1 | | 9/2001 | Sledd et al. | |
| 2003/0155019 A1 | | 8/2003 | Hess et al. | |

FOREIGN PATENT DOCUMENTS

| | | |
|---|---|---|
| DE | 198 09 047 | 9/1999 |
| DE | 19809047 | 9/1999 |
| EP | 0 385 286 | 9/1990 |
| EP | 0 958 155 | 10/2002 |
| FR | 2 580 557 | 10/1986 |
| JP | 9 273 653 | 10/1997 |
| JP | 11063276 | 3/1999 |
| JP | 2001123907 | 5/2001 |
| JP | 2001523194 | 11/2001 |

\* cited by examiner

*Primary Examiner*—John K Fristoe, Jr.
(74) *Attorney, Agent, or Firm*—Kenyon & Kenyon LLP

(57) ABSTRACT

A solenoid valve, in particular for a fluid-regulated heating and/or cooling system, including a valve housing having at least one feed channel and at least one discharge channel and an electromagnetically switched valve member which establishes the connection between the feed channel and the discharge channel in one switch position and blocks it in the other switch position. The valve member is rigidly connected to an armature which may be moved by displacing fluid in a guide bushing of a magnet coil, the guide bushing being inserted into an expanded part of an opening of the magnet coil which is delimited by an annular shoulder. A damping disk surrounding the armature is situated between the annular shoulder and an adjacent face end of the guide bushing.

15 Claims, 3 Drawing Sheets

SOLENOID VALVE HAVING A NOISE-REDUCING DAMPING DISK

FIELD OF THE INVENTION

The present invention relates to a solenoid valve.

BACKGROUND INFORMATION

Solenoid valves of this type are used in motor vehicles in particular, for example, in fluid-regulated heat exchangers of their heating and/or air conditioning systems or as switching valves that short-circuit a coolant stream from an internal combustion engine of the motor vehicles in one of the two switch settings and in the other guide it across a heat exchanger. The solenoid valves may be activated by clock pulses as a function of the particular temperature in the heating and/or air conditioning system or in a passenger compartment of the motor vehicle, the flow rate being essentially determined by the mean time area. The valve member is opened by the fluid pressure and/or a valve spring acting on a valve shaft and is closed by excitation of the magnet coil acting on the armature. The space in which the armature is situated is not hermetically sealed but is instead filled with fluid. This fluid is intended to dampen the movement of the armature hydraulically in order to prevent the valve from opening or closing abruptly, thus reducing the noise associated with this. Due to the relatively large play required between the armature and the guide bushing for equalizing the tolerance between the components of the entire valve, the hydraulic damping produced by the fluid and accordingly the noise-reducing effect is, however, relatively low.

To reduce the noise produced when closing the valve, the applicant in European Published Patent Application No. 0 958 155 already described providing means on the side of the valve shaft facing the valve member which decelerate the speed of the valve shaft when the valve member is closed. Such means may be, among other things, formed by a damping disk which is attached to the valve shaft and is guided with low play in a fluid-filled chamber of the valve housing. Each time the valve member moves, the fluid must flow through a narrow annular gap between an outer circumference of the damping disk and an adjacent wall part of the valve housing, which slows the movement of the valve shaft. However, the provision of the damping disk and the chamber result in increased expense in manufacturing the solenoid valve. In addition, relatively close tolerances must be adhered to, which is difficult if low-priced components are used due to the temperature differences of the fluid when operating the valve in heating and/or air conditioning systems.

SUMMARY OF THE INVENTION

In the solenoid valve a very low play in the annular gap between the armature and its guidance is achieved using the simplest structural means and without limiting the movability of the armature in the area of the damping disk. The damping disk thus increases the hydraulic damping considerably and consequently reduces the production of noise. In this connection, the damping disk performs a function similar to that of a piston ring of a piston-cylinder array by providing a stronger seal for the annular gap and accordingly increasing the flow resistance when displacing fluid past the armature without negatively influencing the forces needed for moving the armature.

In a preferred embodiment of the present invention, an annular gap is provided between an inner circumference of the damping disk and the armature, forming the only flow path for the displaced fluid in the area of the damping disk, the annular gap having a clearance of less than 0.04 mm and preferably less than 0.025 mm at least over a part of and expediently over the entire length of the displacement path of the armature.

Another advantageous embodiment of the present invention provides that the damping disk is to a limited degree axially movable between the annular shoulder and the adjacent face end of the guide bushing. This has the result that the outer circumference of the damping disk, which is advantageously situated in the radial of the inner wall of the expanded part of the opening, is pressed against the face end of the guide bushing or the annular shoulder by the fluid displaced by the armature over at least a part of the displacement path of the armature, thus preventing the fluid from flowing around the damping disk.

The damping disk may be slotted or unslotted and is preferably made of bronze; however, in principle it may be manufactured from a suitable synthetic material, polypropylene sulfide, for example.

DETAILED DESCRIPTION

Figure 1:
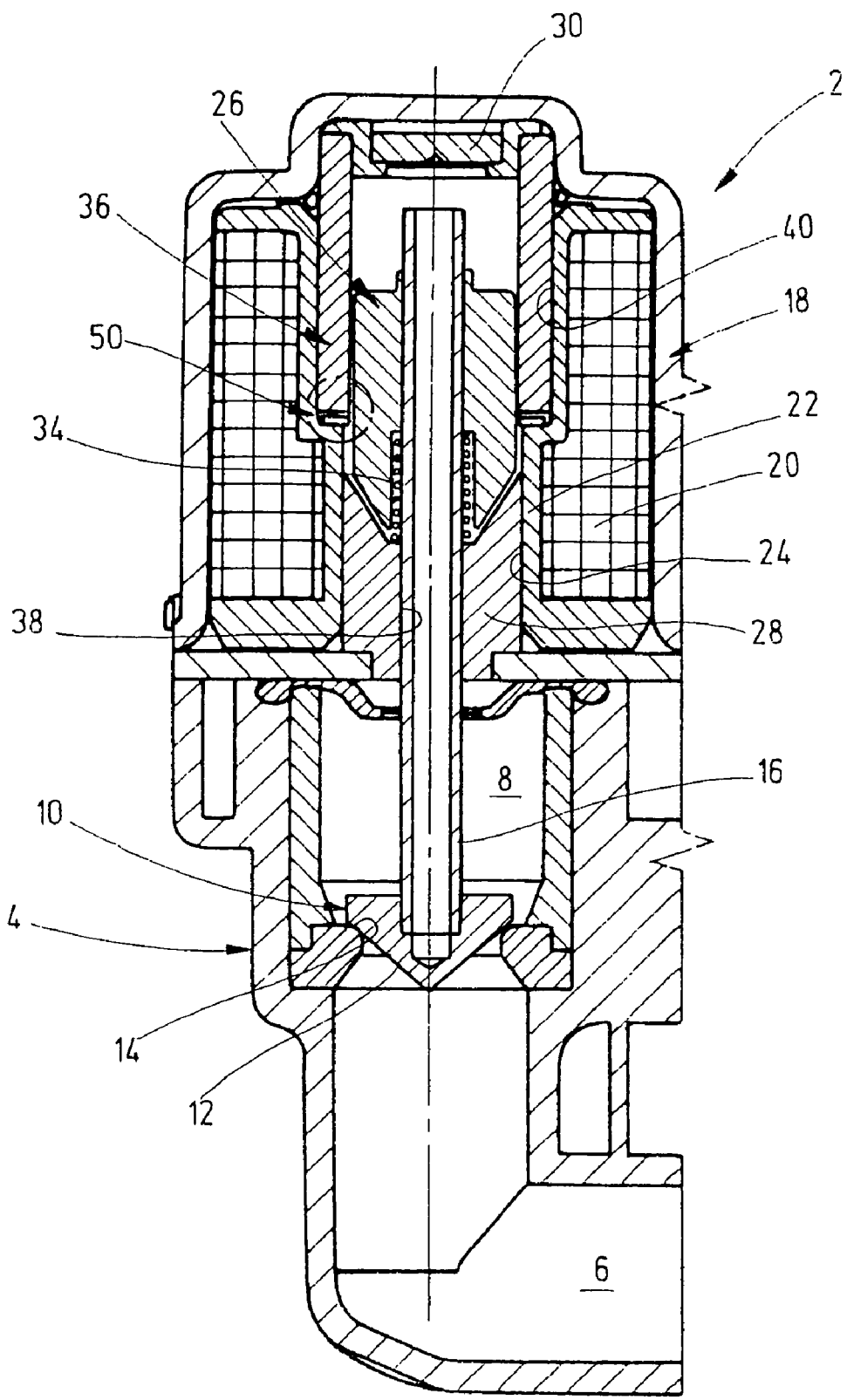
FIG. 1 shows a cross section of a solenoid valve in its energized closed position.

Solenoid valve 2 shown in the drawing situated between a heating and/or cooling circuit of an internal combustion engine and a heater core of a motor vehicle (not shown) has a valve housing 4 having a feed channel 6 connected to the cooling circuit of the internal combustion engine and a discharge channel 8 connected to the heater core. Within valve housing 4 is located a movable valve member 10 which has a valve cone 12, which in the closed position of valve 2 shown in FIG. 1 interacts with a valve seat 14 in housing 4 and blocks the connection between feed channel 6 and discharge channel 8.

Valve member 10 is attached to an elongated hollow valve shaft 16 which projects from valve housing 4 into a pot magnet 18 fastened onto valve housing 4 with sealing effect. Pot magnet 18 encloses a cylindrical magnet coil 20 which is wound on a coil former 22 manufactured from plastic by injection molding. Coil former 22 has an axial opening 24 for valve shaft 16, to the upper end of which an armature 26 is attached. Armature 26 interacts with magnet coil 20 and with an armature core 28 mounted in a lower part of opening 24, thus forming an electromagnetic actuator for the axial displacement of valve member 10.

Figure 2:
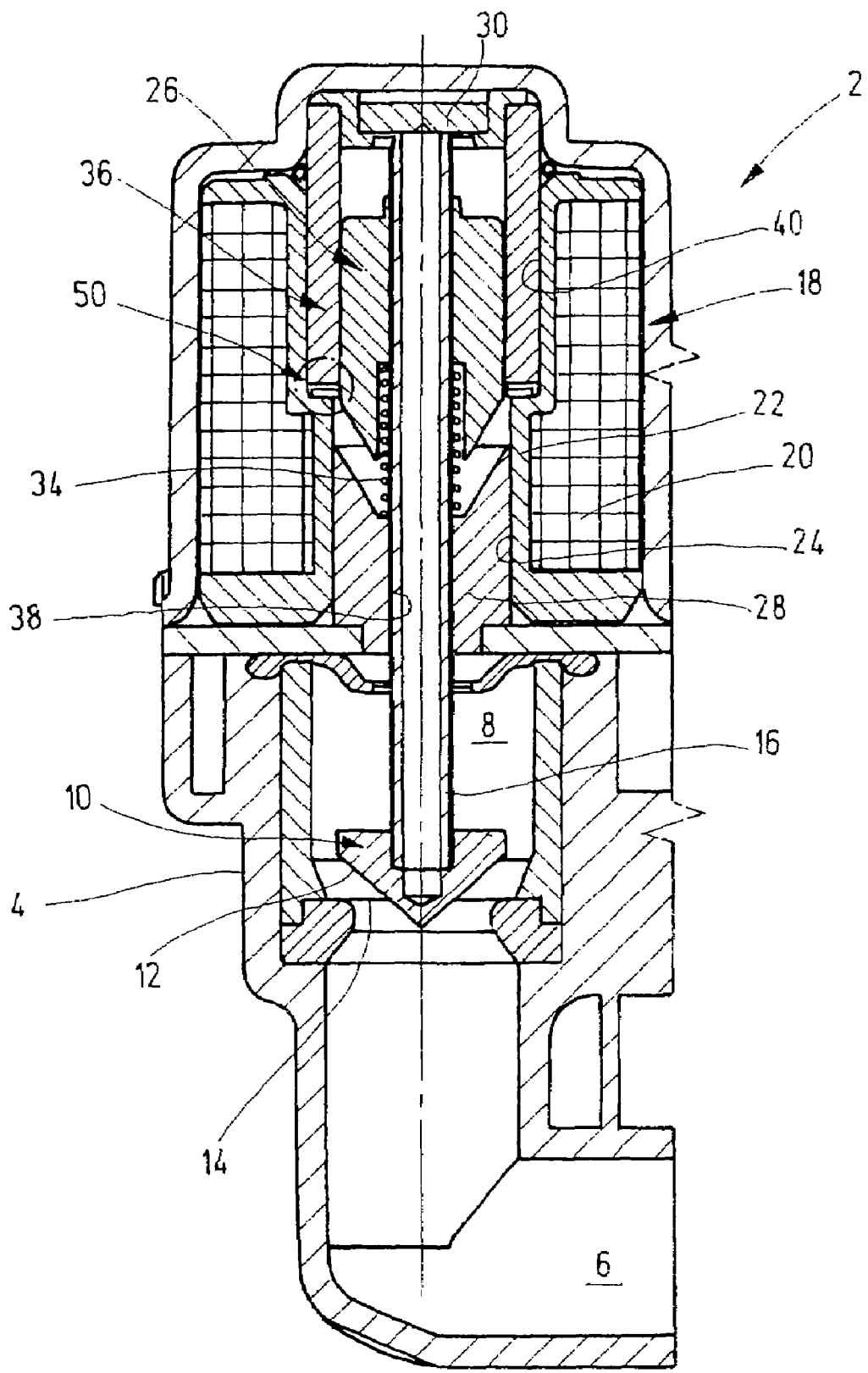
FIG. 2 shows a cross section of the solenoid valve in its de-energized open position.

As long as no power for excitation is fed to magnet coil 20, the fluid pressure prevailing in the heating and/or cooling circuit of the motor vehicle and accordingly also in feed channel 6 presses valve member 10 into the open position shown in FIG. 2. In the open position, in which the upper face end of valve shaft 16 is in contact with a stop 30 placed above opening 24 in pot magnet 18, valve cone 12 is lifted off from valve seat 14 and the connection between feed channel 6 and discharge channel 8 is opened. As soon as magnet coil 20 is excited by current feed, armature core 28 pulls armature 26 downward into the closed position shown in FIG. 1 against the fluid pressure in feed channel 6 and against the force of a valve spring 34 inserted between armature 26 and armature core 28.

In addition to magnet coil 20, armature core 28, valve spring 34 and valve shaft 16 including armature 26, pot magnet 18 further encloses a guide bushing 36 for armature 26 situated in opening 24 of coil former 22. The open space remaining between components 16, 20, 26, 28, 34 and 36 in the interior of pot magnet 18 is filled with fluid from the heating and/or cooling circuit during the operation of solenoid valve 2, the fluid being drawn up through a narrow annular gap between valve stem 16 and the inside wall of a valve stem bore 38 in armature 28 by the application of a partial vacuum, i.e., as a consequence of a pumping action of armature 26 moved up and down while displacing air into the open space.

Cylindrical guide bushing 36 used for guiding armature 26 is inserted from above into an expanded upper part 40 of stepped opening 24 of coil former 22 and in the open position surrounds an upper cylindrical part of armature 26 at a radial distance, which may not be reduced as desired due to the manufacturing and assembly tolerances of components 12, 14, 16, 28, 36. As shown best in FIGS. 3 and 4, its lower face end 42 is situated at an axial distance of approximately 0.5 to 1.5 mm above an annular shoulder 44, which limits expanded part 40 of opening 24 of coil former 22 toward the bottom. Annular shoulder 44 is adjoined toward the bottom by a narrowed part 46 of opening 24, into the lower end of which armature core 28 is fitted. The upper end of narrowed part 46 of opening 24 accommodates the part of armature 26 projecting from guide bushing 36, the tapering lower end of which has a conical outside circumference. In the open position of valve 2 (FIG. 4), transition 48 between the cylindrical circumferential surface of the upper part and the conical circumferential surface of the lower end of armature 26 is located at a small axial distance below lower face end 42 of guide bushing 36.

Due to the relatively large radial play present between guide bushing 36 and armature 26 for tolerance equalization, the hydraulic damping of armature 26 is relatively low in its axial movement in guide bushing 36. In order, however, to avoid abrupt opening or closing of valve 2 and accordingly to minimize noise caused by opening or closing, a damping disk 50 surrounding armature 26 is situated between annular shoulder 44 and adjacent face end 42 of guide bushing 36. At this point, damping disk 50 should provide a reduction of the cross-sectional dimensions of an annular gap 52 between armature 26 and its guidance, as a result of which a portion of the fluid enclosed in pot magnet 18 is displaced past armature 26 each time it is moved axially.

Figure 3:
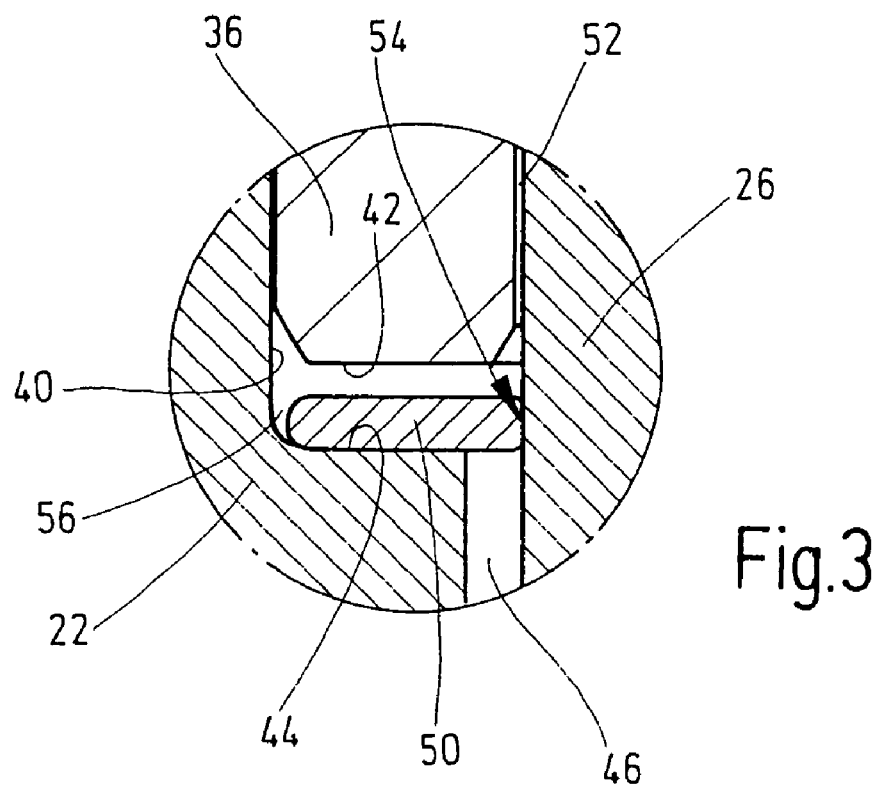
FIG. 3 shows an enlarged detail view of section III from FIG. 1.
Figure 4:
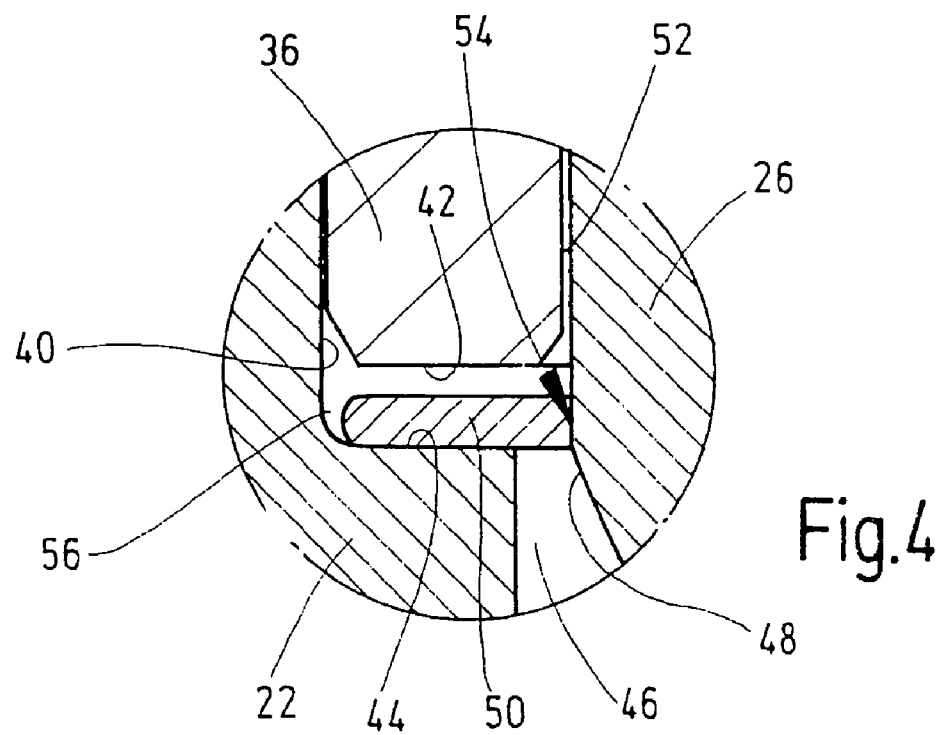
FIG. 4 shows an enlarged detail view of section IV from FIG. 2.

As is also best shown in FIGS. 3 and 4, damping disk 50 has a circular bore for armature 26, the inside diameter of which above the stroke of armature 26 is adapted to the outside diameter of its upper cylindrical part, so that an annular gap 54 formed between the inner circumference of damping disk 50 and the outer circumferential surface of armature 26 has a very small clearance of approximately 0.02 mm. In contrast, an annular gap 56 formed between the outer circumference of disk 50 and the inner circumference of the expanded part of opening 24 has relatively large dimensions so that disk 50 is axially movable in the fluid in the intermediate space between annular shoulder 44 and lower face end 42 of guide bushing 36.

Damping disk 50 has two flat broad surfaces which are diametrically opposed to a complementary flat lower face of guide bushing 36 or a complementary flat annular surface of annular shoulder 44. Furthermore, damping disk 50 may be radially or obliquely slotted at a point along its circumference similar to a piston ring of a piston of an internal combustion engine in order to avoid tolerance problems.

Damping disk 50 is preferably made of bronze; however, it is in principle also possible to use other metals or plastics, such as polypropylene sulfide (PPS), for example.

When armature 26 is moved downward into the closed position, the fluid displaced by armature 26 presses damping disk 50 upward so that its upper broad surface is in contact with the adjacent lower face of guide bushing 36 with sealing effect and the displaced fluid is only able to pass through narrow annular gap 54 between the inner circumference of damping disk 50 and the outer circumference of armature 26, which produces a strong hydraulic damping of armature 26. When armature 26 is moved upward into the open position, damping disk 50 is pressed downward against annular shoulder 44 in the opposite direction by the fluid displaced by armature 26, so that its lower broad surface is in contact with annular shoulder 44 with sealing effect and forces the displaced fluid through annular gap 54, as a result of which this movement of armature 26 is subject to strong hydraulic damping.

In comparative tests in which the production of noise was measured when closing a solenoid valve 2 without or with a damping disk 50, it was therefore possible as expected to detect a considerable noise reduction when damping disk 50 was used.

The characteristic curve of the hydraulic damping of armature 26 and accordingly of valve member 10 may be changed as desired by changing the internal diameter of damping disk 50 or the shape of the outer circumferential surface of armature 26, which moves past damping disk 50 between the closed position and the open position. For example, a narrowing situated in the center of this area and extending over a part of the displacement path of armature 26 would provide greater play between damping disk 50 and armature 26 over the height of the narrowing and accordingly a less severely decelerated movement of armature 26 over a middle portion of the distance between the closed position and open position.

What is claimed is:

1. A solenoid valve, comprising:
   a valve housing including at least one feed channel and at least one discharge channel;
   an electromagnetically switched valve member that establishes a connection between the at least one feed channel and the at least one discharge channel in a first switch position and blocks the connection in a second switch position;
   a magnet coil including a guide bushing that is inserted into an expanded part of an opening of the magnet coil that is delimited by an annular shoulder;
   an armature to which is rigidly connected the valve member and capable of movement by displacing fluid in the guide bushing; and
   a damping disk surrounding the armature and situated between the annular shoulder and an adjacent face end of the guide bushing, the damping disk configured to dampen the movement of the armature by restriction of a flow of fluid through an annular gap between an inner circumference of the damping disk and an outer circumference of the armature.

2. The solenoid valve as recited in claim 1, wherein the armature is axially movable in relation to the damping disk.

3. The solenoid valve as recited in claim 1, wherein an annular gap between an inner circumference of the damping disk and the armature has a clearance of less than 0.05 mm at least over a part of a displacement path of the armature.

4. The solenoid valve as recited in claim 3, wherein the annular gap has a clearance of less than 0.05 mm over an entire displacement path of the armature.

5. The solenoid valve as recited in claim 1, wherein the damping disk is to a limited degree axially movable between the annular shoulder and the adjacent face end of the guide bushing.

6. The solenoid valve as recited in claim 1, wherein the damping disk is pressed against one of the face end of the guide bushing and the annular shoulder by the fluid displaced by the armature over at least a part of the displacement path of the armature.

7. The solenoid valve as recited in claim 1, wherein an external circumference of the damping disk is situated at a radial distance from an inner wall of the expanded part of the opening.

8. The solenoid valve as recited in claim 1, wherein the damping disk includes bronze.

9. The solenoid valve as recited in claim 1, wherein the damping disk includes polypropylene sulfide.

10. The solenoid valve as recited in claim 1, wherein the damping disk is slotted.

11. The solenoid valve as recited in claim 1, wherein the damping disk has no interruption.

12. The solenoid valve as recited in claim 1, wherein the solenoid valve is for at least one of a fluid-regulated heating system and a fluid-regulated cooling system.

13. The solenoid valve as recited in claim 1, wherein an annular gap between an inner circumference of the damping disk and the armature has a clearance of less than 0.025 mm at least over a part of a displacement path of the armature.

14. The solenoid valve as recited in claim 13, wherein the annular gap has a clearance of less than 0.025 mm over an entire displacement path of the armature.

15. The solenoid valve as recited in claim 1, wherein the damping disk is movable between a first axial position, in which a first axial surface of the damping disk forms a seal with the adjacent face end of the guide bushing, and a second axial position, in which a second axial surface of the damping disk forms a seal with the annular shoulder.

* * * * *